United States Patent
Xu

(10) Patent No.: US 9,900,488 B2
(45) Date of Patent: Feb. 20, 2018

(54) ELECTRONIC DEVICE AND METHOD FOR CONTROLLING CAMERAS THEREOF WHICH CAN AUTOMATICALLY CONTROL A SWITCHING BETWEEN A FRONT CAMERA AND A REAR CAMERA ACCORDING TO BLOCKING CASES OF THE FRONT CAMERA AND THE REAR CAMERA OF THE ELECTRONIC DEVICE

(71) Applicant: Lenovo (Beijing) Co., Ltd., Beijing (CN)

(72) Inventor: Ben Xu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/847,673

(22) Filed: Sep. 8, 2015

(65) Prior Publication Data

US 2016/0301832 A1    Oct. 13, 2016

(30) Foreign Application Priority Data

Apr. 7, 2015  (CN) .......................... 2015 1 0162248

(51) Int. Cl.
    *H04N 5/232*    (2006.01)
(52) U.S. Cl.
    CPC .................................. *H04N 5/232* (2013.01)
(58) Field of Classification Search
    CPC ................................................... H04N 5/2251
    See application file for complete search history.

(56) References Cited

U.S. PATENT DOCUMENTS

| | | | |
|---|---|---|---|
| 5,550,754 A * | 8/1996 | McNelley | H04M 1/725 348/14.01 |
| 2011/0039603 A1 | 2/2011 | Kim | |
| 2012/0129581 A1* | 5/2012 | Choi | H04M 1/0218 455/575.3 |

(Continued)

FOREIGN PATENT DOCUMENTS

| CN | 101997976 | 3/2011 |
|---|---|---|
| CN | 103685762 | 3/2014 |

(Continued)

OTHER PUBLICATIONS

CN104219456A; Cellphone camera with intelligent dimming function; Dec. 2014; Shinan Branch Qingdao Blue Print Culture Transmission Co Ltd; English Translation Google Patents.*

(Continued)

*Primary Examiner* — Roberto Velez
*Assistant Examiner* — Cynthia Segura
(74) *Attorney, Agent, or Firm* — Brinks Gilson & Lione; G. Peter Nichols

(57) ABSTRACT

An electronic device includes a flexible screen capable of being folded and/or bent by a user. A first camera is disposed on a first surface of the flexible screen and a second camera is disposed on a second surface of the flexible screen. A detection unit is configured to detect, in a first condition, whether the first camera and/or the second camera is blocked because the user folds and/or bends the flexible screen. A control unit is configured to control an ON/OFF state of the first camera and/or the second camera based on a detection result of the detection unit.

12 Claims, 5 Drawing Sheets

(56) References Cited

U.S. PATENT DOCUMENTS

| | | | |
|---|---|---|---|
| 2013/0065614 A1* | 3/2013 | Jung | H04M 1/72522 455/456.3 |
| 2014/0015743 A1 | 1/2014 | Seo | |
| 2014/0080416 A1* | 3/2014 | Seo | H04M 1/7253 455/41.2 |
| 2014/0285476 A1* | 9/2014 | Cho | G06F 1/1601 345/204 |
| 2014/0362257 A1 | 12/2014 | Viljamaa | |
| 2015/0049234 A1* | 2/2015 | Jung | H04N 5/2258 348/333.05 |
| 2015/0074593 A1* | 3/2015 | Lo | G06F 3/0485 715/784 |
| 2015/0222880 A1* | 8/2015 | Choi | G03B 37/04 348/43 |
| 2015/0381929 A1* | 12/2015 | Lee | H04M 1/0202 348/14.03 |
| 2016/0026219 A1* | 1/2016 | Kim | H04M 1/0245 345/173 |
| 2016/0057356 A1* | 2/2016 | Nagano | G09G 3/002 348/333.06 |
| 2016/0062485 A1* | 3/2016 | Kondo | G09G 5/00 345/156 |
| 2016/0085319 A1* | 3/2016 | Kim | G06F 3/0346 345/156 |
| 2016/0113517 A1* | 4/2016 | Lee | G01J 5/0859 600/474 |
| 2016/0163282 A1* | 6/2016 | Hsieh | G09G 5/006 345/681 |
| 2016/0191680 A1* | 6/2016 | Jung | H04M 1/0241 455/575.1 |
| 2016/0373654 A1* | 12/2016 | Kwon | H04N 5/2251 |
| 2017/0038800 A1* | 2/2017 | Xu | G06F 1/1652 |
| 2017/0052566 A1* | 2/2017 | Ka | G06F 3/0483 |
| 2017/0124942 A1* | 5/2017 | Evans | G02B 27/0093 |

FOREIGN PATENT DOCUMENTS

| | | | |
|---|---|---|---|
| CN | 104219456 A * | 12/2014 | H04N 5/235 |
| CN | 104239029 | 12/2014 | |
| CN | 104469165 | 3/2015 | |
| WO | WO 2014/148698 | 9/2014 | |

OTHER PUBLICATIONS

First Office Action dated Jun. 20, 2017 (14 pages including English translation) out of Chinese priority Application No. 201510162248.2.

* cited by examiner

ELECTRONIC DEVICE AND METHOD FOR CONTROLLING CAMERAS THEREOF WHICH CAN AUTOMATICALLY CONTROL A SWITCHING BETWEEN A FRONT CAMERA AND A REAR CAMERA ACCORDING TO BLOCKING CASES OF THE FRONT CAMERA AND THE REAR CAMERA OF THE ELECTRONIC DEVICE

This application claims priority to Chinese patent application No. 201510162248.2 filed on Apr. 7, 2015, the entire contents of which are incorporated herein by reference.

The present disclosure relates to an electronic device and a method for controlling cameras thereof, and more particularly, to an electronic device and a method for controlling cameras thereof, which can automatically control a switching between a front camera and a rear camera according to blocking cases of the front camera and the rear camera of the electronic device.

BACKGROUND

A situation that a front camera or a rear camera is blocked may occur when a flexible screen is folded. For example, an upper half of the flexible screen being folded forward causes the front camera to be blocked and the rear camera becomes the front camera, or an upper half of the flexible screen being folded backward causes the rear camera to be blocked and the front camera becomes the rear camera. Since a system does not know which camera is blocked, in this case, a user needs to manually select a non-blocked camera to take pictures. Further, in the folding cases described above, the system does not know that the non-blocked camera has already been inverted, that is, the original front camera has become an actual rear camera, a captured image is upside down. This results in poor user experience.

SUMMARY

To solve the above technical problem, the present disclosure is intended to provide an electronic device and a method for controlling cameras thereof, which can automatically control a switching between a front camera and a rear camera according to blocking cases of the front camera and the rear camera of the electronic device.

According to an aspect of the present disclosure, there is provided an electronic device, comprising: a flexible screen capable of being folded and/or bent by a user; a first camera and a second camera, disposed on a first surface of the flexible screen and a second surface of the flexible screen, respectively; a detection unit configured to detect, in a first condition, whether the first camera and/or the second camera is blocked because the user folds and/or bends the flexible screen; and a control unit configured to control an ON/OFF state of the first camera and/or the second camera based on a detection result of the detection unit.

In addition, according to an embodiment of the present disclosure, the electronic device further comprises a first gravity sensing unit and a second gravity sensing unit, wherein the first gravity sensing unit is located on the first surface and has a distance less than a fifth predetermined threshold with the first camera, and the second gravity sensing unit is located on the second surface and has a distance less than a sixth predetermined threshold with the second camera, and when the first gravity sensing unit and/or the second gravity sensing unit senses that first camera and/or the second camera is inverted due to the flexible screen being folded and/or bent, the control unit flips an image captured by the first camera and/or the second camera.

According to another aspect of the present disclosure, there is provided a control method for cameras of an electronic device, the electronic device including a flexible screen capable of being folded and/or bent by a user, a first camera and a second camera disposed on a first surface of the flexible screen and a second surface of the flexible screen, respectively, the control method comprising: detecting, in a first condition, whether the first camera and/or the second camera is blocked because the user folds and/or bends the flexible screen; and controlling an ON/OFF state of the first camera and/or the second camera based on a detection result.

In addition, according to an embodiment of the present disclosure, in the control method, the flexible screen further includes a first gravity sensing unit and a second gravity sensing unit, wherein the first gravity sensing unit is located on the first surface and has a distance less than a fifth predetermined threshold with the first camera, and the second gravity sensing unit is located on the second surface and has a distance less than a sixth predetermined threshold with the second camera, and when the first gravity sensing unit and/or the second gravity sensing unit senses that the first camera and/or the second camera is inverted due to the flexible screen being folded and/or bent, an image captured by the first camera and/or the second camera is flipped.

Technical Effect

The electronic device and the method for controlling cameras thereof according to the present disclosure detect whether the front camera and/or the rear camera is blocked because the user folds and/or bends the flexible screen, and control an ON/OFF state of the front camera and/or the rear camera based on a detection result. Thus, when the front camera and/or the rear camera of the electronic device is blocked, a switching between the front camera and the rear camera can be automatically controlled according to blocking cases of the front camera and/or the rear camera of the electronic device, and there is no need for the user to select manually. In addition, the electronic device and the method for controlling cameras thereof according to the present disclosure detect inverted cases of the front camera and the rear camera by setting the gravity sensing units to the front camera and the rear camera, and the control unit controls to flip the captured image when the cameras are inverted, and therefore it is possible to automatically determine whether the captured image is inverted and correspondingly make the flip. Therefore, user experience can be improved effectively.

BRIEF DESCRIPTION OF THE DRAWINGS

The above and other objectives, advantages and features of the present disclosure may be understood more comprehensively in conjunction with the accompanying drawings, in the drawings.

Figure 1:
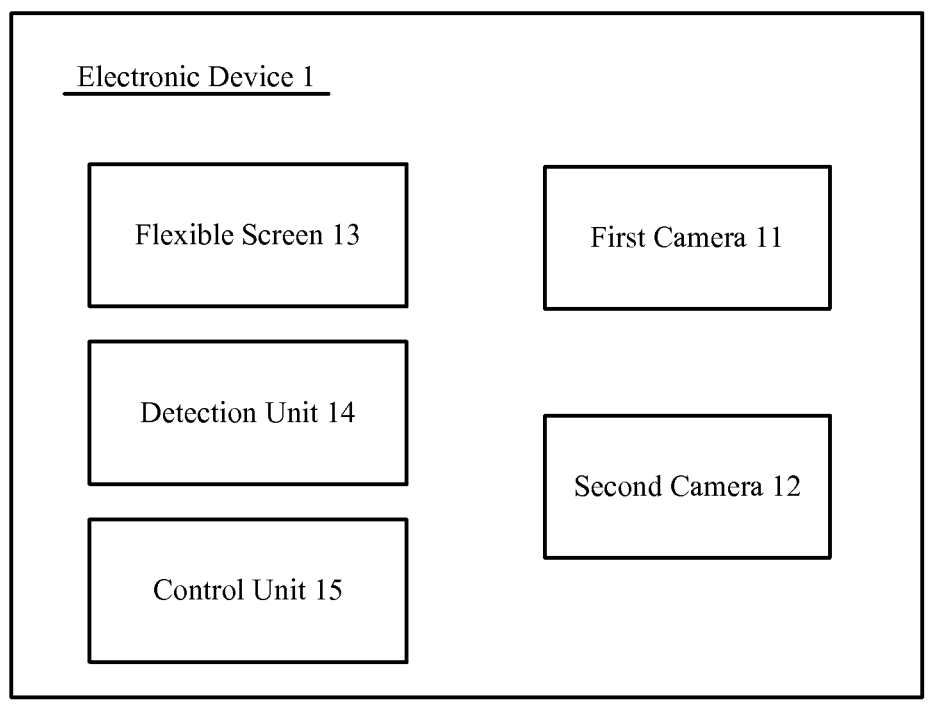
FIG. 1 is a diagram showing hardware configuration of the electronic device according to an embodiment of the present disclosure.

The accompanying drawings are intended to describe exemplary embodiments of the present disclosure and should not be construed as limiting the scope of the present disclosure. Unless explicitly stated, the drawings should not be considered as drawn to scale.

DETAILED DESCRIPTION

Hereinafter, preferred embodiments of the present disclosure will be described in detail. In the specification and the drawings of the present disclosure, the same reference numerals are adopted to indicate elements and functions that are substantially the same, and repeated explanations for these elements and features will be omitted. In addition, for clarity and simplicity, explanations for functions and configurations well known in the art will be omitted.

Preferred embodiments of the present disclosure will be described in detail below with reference to the accompanying drawings.

FIG. 1 is a diagram showing hardware configuration of the electronic device 1 according to an embodiment of the present disclosure. The electronic device 1 according to an embodiment of the present disclosure may be applied to such electronic devices like a tablet computer, a smart phone, a Personal Digital Assistant, a smart wearable device, and so on.

As shown in FIG. 1, the electronic device 1 includes a first camera 11, a second camera 12, a flexible screen 13, a detection unit 14 and a control unit 15.

The flexible screen 13 is capable of being folded and/or bent by a user. The flexible screen 13 may be an active-matrix-electrophoretic-type flexible screen, an OLED-type flexible screen, and other types of flexible screen.

The first camera 11 and the second camera 12 are disposed on a first surface of the flexible screen 13 and a second surface of the flexible screen 13, respectively. Preferably, the first camera 11 and the second camera 12 are webcams disposed on the flexible screen 13. However, the present disclosure is not limited thereto. The first camera 11 and the second camera 12 may also be a pinhole vidicon, or a pinhole camera, etc. Preferably, the first surface and the second surface are a surface facing the user (i.e., front surface) and a surface opposite to the user (i.e., back surface), respectively. However, the present disclosure is not limited thereto. The first surface may be the back surface of the flexible screen 13 and the second surface may be the front surface of the flexible screen 13.

The detection unit 14 detects, in a first condition, whether the first camera 11 and/or the second camera 12 is blocked because the user folds and/or bends the flexible screen 13. Preferably, the first condition is that the user enables a camera function of the electronic device. If the user does not enable the camera function of the electronic device, then the detection unit 14 does not operate, and thus the control unit 15 does not control a switching between the first camera 11 and the second camera 12, thereby saving power for the electronic device. Operations of the detection unit 14 will be explained later in detail by way of examples.

The control unit 15 controls an ON/OFF state of the first camera 11 and/or the second camera 12 based on a detection result of the detection unit 14. The control unit 15 is a processor such as a CPU. When the detection unit 14 detects that one of the first camera 11 and the second camera 12 is blocked, the control unit 15 turns off the blocked camera and turns on the non-blocked camera; and when the detection unit 14 detects that both the first camera 11 and the second camera 12 are blocked, the control unit 15 turns off the first camera 11 and the second camera 12.

Next, operations of the detection unit 14 and the control unit 15 will be described in detail with reference to FIGS. 2A to 4.

Figure 2A:
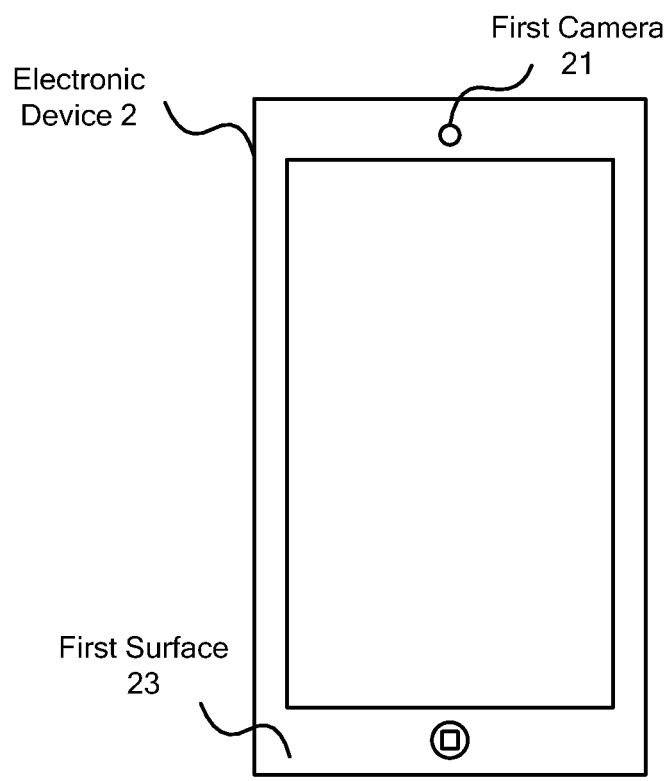
FIG. 2A is a diagram schematically showing a first side of the electronic device according to an embodiment of the present disclosure
Figure 2B:
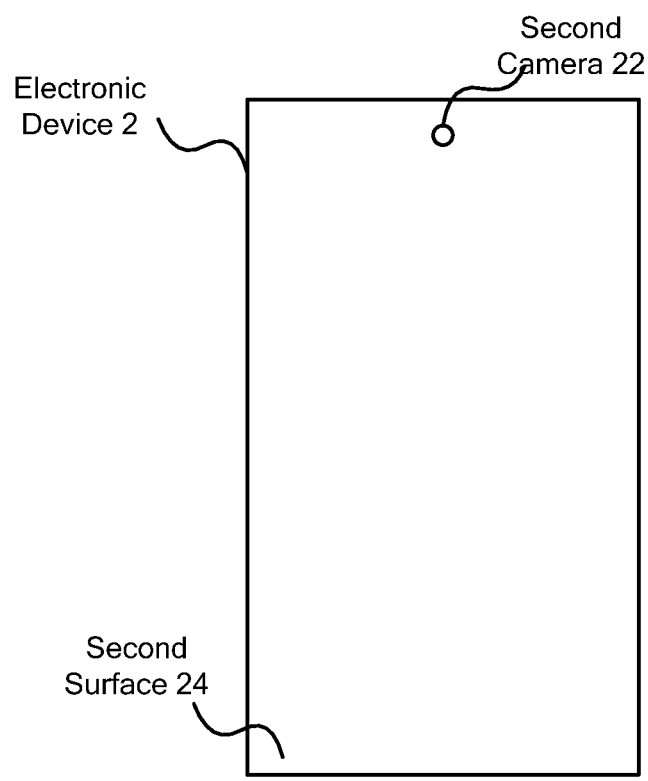
FIG. 2B is a diagram schematically showing a second side of the electronic device according to an embodiment of the present disclosure.

FIGS. 2A and 2B are diagrams schematically showing the electronic device 2 according to an embodiment of the present disclosure. FIGS. 2A and 2B show the front surface (first surface 23) and the back surface (second surface 24) of the electronic device 2, respectively. As shown in FIGS. 2A and 2B, the first camera 21 and the second camera 22 are disposed at a middle position of an upper part of the first surface 23 and the second surface 24 of the electronic device 2, respectively. The second camera 22 is a default camera of the electronic device, that is, when the user enables the camera function of electronic device, the electronic device enables the second camera 22 to take pictures in default. If the user needs to use the first camera 21 to take pictures, the user may manually switch a photo-shooting camera from the second camera 22 to the first camera 21 after enabling the camera function, or when the detection unit 14 detects that the second camera 22 is blocked, the control unit 15 switches the photo-shooting camera from the second camera 22 to the first camera 21, that is, turning off the second camera 22 and enabling the first camera 21. However, the present disclosure is not limited thereto. When the user enables the camera function, the electronic device may concurrently enable both the first camera 21 and the second camera 22, and display images captured by the two cameras in two different regions on the first surface 23 separately.

Figure 3A:
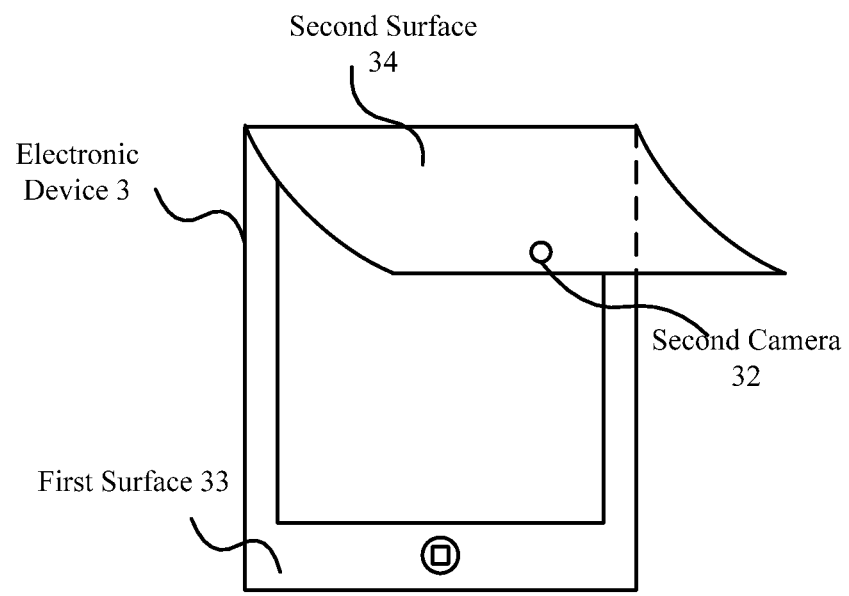
FIG. 3A is a diagram schematically showing a first side of the electronic device according to an embodiment of the present disclosure that is folded
Figure 3B:
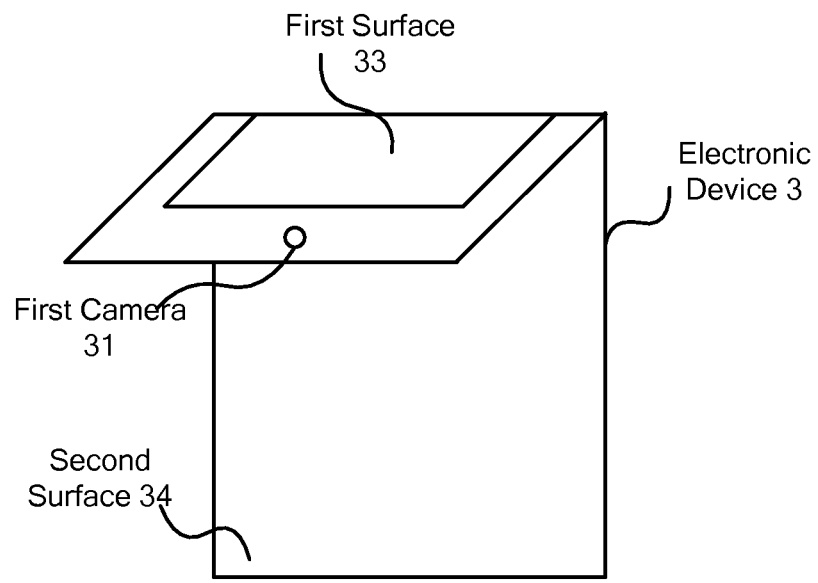
FIG. 3B is a diagram schematically showing a second side of the electronic device according to an embodiment of the present disclosure that is folded.
Figure 3C:
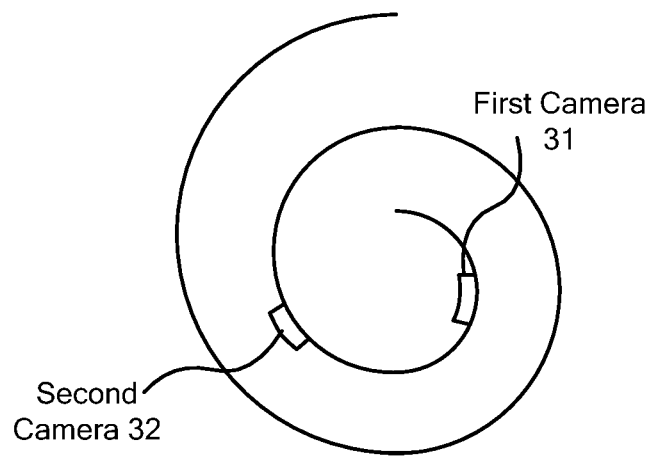
FIG. 3C is a diagram schematically showing a top view of the electronic device according to an embodiment of the present disclosure that is folded
Figure 4:
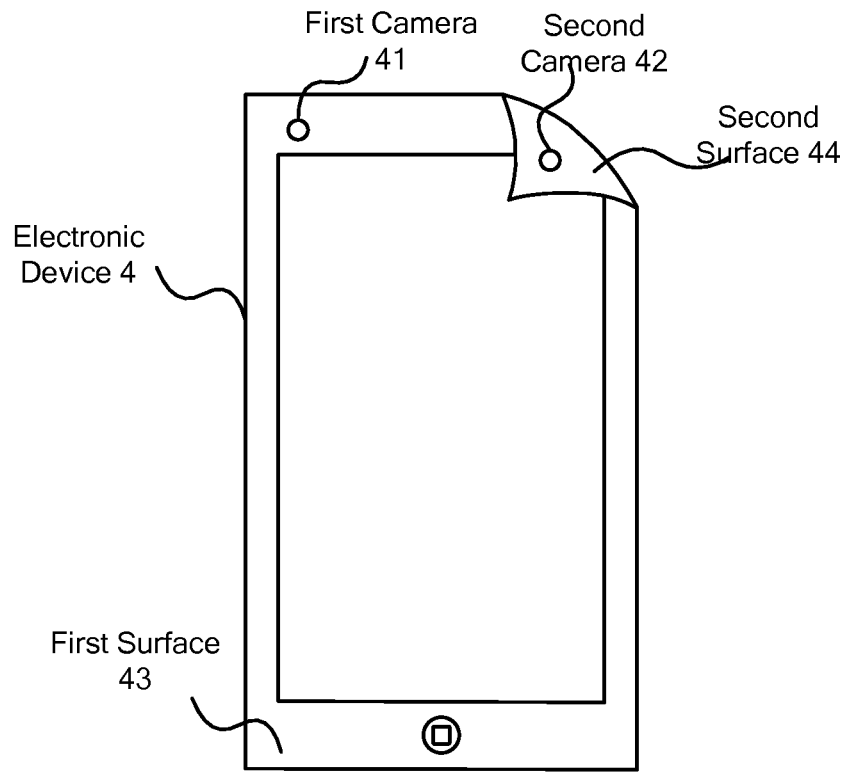
FIG. 4 is another diagram schematically showing that the electronic device according to an embodiment of the present disclosure is folded.

FIGS. 3A to 4 schematically show several folded and/or bent states of the electronic device according to an embodiment of the present disclosure. FIGS. 3A to 3C are diagrams schematically showing that the electronic device 3 according to an embodiment of the present disclosure is folded.

As shown in FIG. 3A, the user folds the electronic device 3 forward (i.e., toward the first surface 33) from an upper part with a certain angle, which results in that the first camera (not shown) is blocked, and that the second camera 32 is inverted and becomes a front camera. In this case, if the user is using the second camera 32 to capture an image before the folding, then the control unit (not shown) controls to flip the image captured by the second camera 32; if the user is using the first camera to capture an image before the folding, then the control unit controls to turn off the blocked first camera, turn on the second camera 32, capture an image via the second camera 32, and flip the captured image.

As shown in FIG. 3B, the user folds the electronic device 3 backward (i.e., toward the second surface 34) from an upper part with a certain angle, which results in that the second camera (not shown) is blocked, and that the first camera 31 is inverted and becomes a rear camera. In this case, if the user is using the first camera 31 to capture an image before the folding, then the control unit (not shown) controls to flip the image captured by the first camera 31; if the user is using the second camera to capture an image before the folding, then the control unit controls to turn off the blocked second camera, turn on the first camera 31, capture an image via the first camera 31, and flip the captured image.

Referring back to FIGS. 2A and 2B, preferably, the electronic device 2 includes a first gravity sensing unit (not shown) and a second gravity sensing unit (not shown), wherein the first gravity sensing unit is located on the first surface 23 and has a distance less than a predetermined threshold d1 with the first camera 21, the second gravity sensing unit is located on the second surface 24 and has a distance less than a predetermined threshold d2 with the second camera 22, and when the first gravity sensing unit and/or the second gravity sensing unit senses that the first camera 21 and/or the second camera 22 is inverted due to the flexible screen being folded and/or bent, the control unit flips the image captured by the first camera 21 and/or the second camera 22. The predetermined threshold d1 may be equal to the predetermined threshold d2, and in order to ensure that the gravity sensing unit can accurately sense whether a camera is inverted, the gravity sensing unit should be close to the camera, and those skilled in the art may set the predetermined thresholds d1 and d2 according to an actual case. Optionally, the gravity sensing unit may also be integrated in the camera as a component thereof.

FIGS. 3A and 3B show the cases that a camera is blocked because the electronic device 3 is folded. However, the present disclosure is not limited thereto. As known by those skilled in the art, a case of blocking a camera, similar to those in FIGS. 3A and 3B, may also occur by bending an upper part of the electronic device 3 to a certain degree.

As shown in FIG. 3C, the user bends the electronic device 3 into two circles, which results in that both the first camera 31 and the second camera 32 are blocked. In this case, no matter which camera is being used by the user to capture an image before the bending, the control unit controls to turn off the camera being used.

FIG. 3C shows the case of bending the electronic device 3 into two circles to block two cameras. However, the present disclosure is not limited thereto. As known by those skilled in the art, when the electronic device 3 is folded for multiple times, a case of blocking two cameras, similar to that in FIG. 3C, may also occur.

Although FIGS. 2A to 3C show that the first camera and the second camera are respectively disposed at the middle position of the upper part of the flexible screen, positions of the first camera and the second camera are not limited thereto. FIG. 4 is another diagram schematically showing that the electronic device according to an embodiment of the present disclosure is folded. As shown in FIG. 4, the first camera 41 is located at an upper left corner of the first surface 43, and likewise, the second camera 42 is located at an upper left corner of the second surface 44. When the user folds the corner of the second surface 44, where the second camera 42 is located, forward (i.e., toward the first surface 43), the second camera 42 also becomes a front camera, and meanwhile the first camera 42 is not blocked. In this case, if the user is using the first camera 41 to capture an image before the folding, then the control unit continues to use the first camera 41 to capture an image; if the user is using the second camera 42 to capture an image before the folding, then the control unit continues to use the second camera 42 to capture an image and flip an captured image.

FIG. 4 shows the case that one corner of the electronic device is folded. However, the present disclosure is not limited thereto. The user may also adopt the manners shown in FIGS. 3A to 3C to fold and/or bend the electronic device 4. In addition, the user may also concurrently fold and/or bend the regions of the electronic device 4, where the first camera 41 and the second camera 42 are located, and cause a case that the two cameras are both blocked or inverted.

Hereinafter, referring back to FIGS. 3A to 3C, the operations of the detection unit of the electronic device will be described in detail. Detection with regard to whether a camera is blocked performed by the detection unit (not shown) of the electronic device may be implemented by the following modes.

First mode: the detection unit detects a folded state and/or a bent curvature of the electronic device 3, wherein when the detection unit detects that the folded state is a first folded state and/or the bent curvature is a first bent curvature, the detection unit detects that the first camera 31 is blocked, and when the detection unit detects that the folded state is a second folded state and/or the bent curvature is a second bent curvature, the detection unit detects that the second camera 32 is blocked. For example, the detection unit includes multiple position sensors (not shown) disposed with a fixed pitch throughout the electronic device 3. Parameters such as a position of a folded line, an angle between a folded plane and an original plane, a bent region, a bent curvature can be sensed by the multiple position sensors. The detection unit can detect whether a camera is blocked by analyzing the above parameters sensed. For example, if the folded state detected by the detection unit via the multiple position detectors is: a region of an upper part of the first surface 33, where the first camera 31 is included, is folded, and an angle between the folded plane and the original first surface 33 is 30 degrees, then the detection unit detects that the first camera 31 is blocked.

Second mode: the detection unit includes a first luminance sensor (not shown) and a second luminance sensor (not shown). The first luminance sensor is located on the first surface 33, has a distance less than a predetermined threshold d3 with the first camera 31, and is used to sense a luminance of an external environment of the first camera 31. The second luminance sensor is located on the second surface 34, has a distance less than a predetermined threshold d4 with the second camera 32, and is used to sense a luminance of an external environment of the second camera 32. When the first luminance sensor senses that the luminance of the external environment of the first camera 31 is less than a predetermined luminance threshold $D_{lumiannce}$, the detection unit detects that the first camera 31 is blocked. When the second luminance sensor senses that the luminance of the external environment of the second camera 32 is less than the predetermined luminance threshold $D_{lumiannce}$, the detection unit detects that the second camera 32 is blocked.

The predetermined threshold d3 may be equal to the predetermined threshold d4, and in order to ensure that the luminance sensor can accurately sense the luminance of the external environment of a camera, the luminance sensor should be close to the camera. Those skilled in the art may set the predetermined thresholds d3 and d4 according to an actual case. Optionally, the luminance sensor may also be integrated in the camera as a component thereof.

Third mode: the detection unit includes a first distance sensor (not shown) and a second distance sensor (not shown). The first distance sensor is located on the first surface 33, has a distance less than a predetermined threshold d5 with the first camera 31, and is used to sense a distance between an external object and the first camera 31 along the shooting direction of the first camera 31. The second distance sensor (not shown) is located on the second surface 34, has a distance less than a predetermined threshold d6 with the second camera 32, and is used to sense a distance between an external object and the second camera 32 along the shooting direction of the second camera 32. When the first distance sensor senses that the distance between the external object and the first camera 31 is less than a predetermined distance threshold $D_{distance}$, the detection unit detects that the first camera 31 is blocked. When the second distance sensor senses that the distance between the external object and the second camera 32 is less than the predetermined distance threshold $D_{distance}$, the detection unit detects that the second camera 32 is blocked.

The predetermined threshold d5 may be equal to the predetermined threshold d6, and in order to ensure that the distance sensor can accurately sense the distance between an external object and a camera, the distance sensor should be close to the camera. Those skilled in the art may set the predetermined thresholds d5 and d6 according to an actual case. Optionally, the distance sensor may also be integrated in the camera as a component thereof.

Fourth mode: the detection unit detects whether cameras are blocked by detecting RGB order graduation values of images captured by the first camera and the second camera. In an image in a RGB pattern, R represents red, G represents green, B represents blue, and three primary colors R, G, B are superposed to form other colors. In this pattern, each of the primary colors forms a monochromatic channel separately, and luminance of color in each monochromatic channel is 0 to 256 order graduation. Then three monochromatic channels combine into a composite channel, namely, a RGB channel. Thus, color in each part of an image is determined by order graduation value in three monochromatic channels, i.e. RGB channels. The detection unit can detect whether a camera is blocked by extracting an order graduation value of any of the three primary colors of a captured image or an average of order graduation values of the three primary colors and comparing it with a predetermined order graduation value when the camera is blocked. For example, the detection unit sets that a range of an average of RGB order graduation values of a captured image when a camera is blocked is 0 to $H_a$, and an average of RGB order graduation values of an image captured by the first camera 31 is $H_1$, and an average of RGB order graduation values of an image captured by the second camera 32 is $H_2$. The detection unit detects whether $H_1$ and $H_2$ is within the range of 0 to $H_a$, that is, determines whether $0 \leq H_1 \leq H_a$, $0 \leq H_2 \leq H_a$ is established. If established, it indicates that a corresponding camera is blocked, otherwise it is not blocked.

Accordingly, when the front camera and/or the rear camera of the electronic device according to the embodiment of the present disclosure are blocked, a switching between the front camera and the rear camera can be automatically controlled according to blocked cases of the front camera and/or the rear camera of the electronic device, and there is no need for the user to select manually. In addition, the electronic device according to the embodiment of the present disclosure can detect inverted cases of the front camera and the rear camera, and flip the captured image when the cameras are inverted. Thus, it is possible to automatically determine whether the captured image is inverted and correspondingly make a flip, and there is no need for the user to select manually. Therefore, user experience can be improved effectively.

Figure 5:
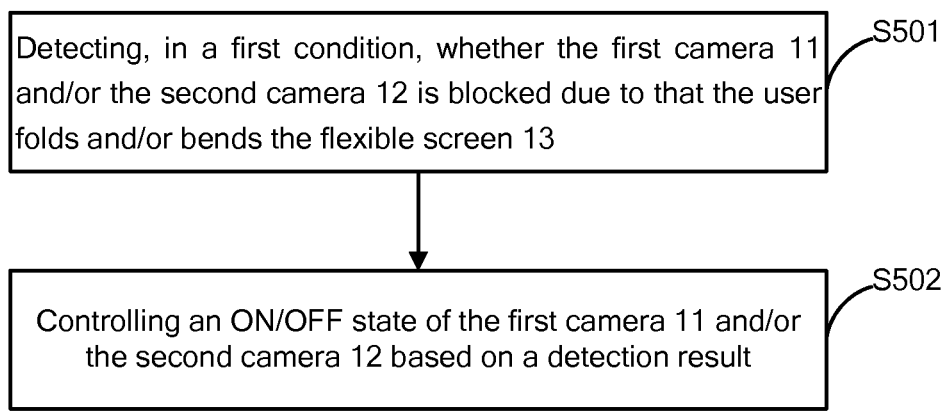
FIG. 5 is a flowchart of the control method for cameras of the electronic device according to an embodiment of the present disclosure.

Hereinafter, a control method for cameras of the electronic device according to an embodiment of the present disclosure will be described in detail with reference to FIG. 5. FIG. 5 is a flowchart of the control method for cameras of the electronic device according to an embodiment of the present disclosure. For convenience of description, the control method 500 will be described in detail in conjunction with respective components of the electronic device 1 shown in FIG. 1, thus detailed descriptions for the respective components will be omitted.

As shown in FIG. 5, in step S501, detecting, in a first condition, whether the first camera 11 and/or the second camera 12 is blocked because the user folds and/or bends the flexible screen 13.

Specifically, the detection unit 14 detects, in a first condition, whether the first camera 11 and/or the second camera 12 is blocked. Preferably, the first condition is that the user enables a camera function of the electronic device 1. If the user does not enable the camera function of the electronic device, then the detection unit 14 does not operate, and thus the control unit 15 does not control a switching between the first camera 11 and the second camera 12, thereby saving power for the electronic device 1.

In step S501, detection with regard to whether the first camera 11 and/or the second camera 12 is blocked may be implemented by the following four modes.

First mode: the detection unit 14 detects a folded state and/or a bent curvature of the electronic device 1, wherein when detecting that the folded state is a first folded state and/or the bent curvature is a first bent curvature, it is detected that the first camera 11 is blocked, and when detecting that the folded state is a second folded state and/or the bent curvature is a second bent curvature, it is detected that the second camera 12 is blocked. For example, multiple position sensors are disposed with a fixed pitch throughout the electronic device 1. Parameters such as a position of a folded line, an angle between a folded plane and an original plane, a bent region, a bent curvature can be sensed by the multiple position sensors. The detection unit 14 can detect whether a camera is blocked by analyzing the above parameters sensed. For example, if the folded state detected by the detection unit 14 via the multiple position detectors is: a region of an upper part of the first surface, where the first camera 11 is included, is folded, and an angle between the folded plane and the original first surface 13 is 30 degrees, then the detection unit detects that the first camera 11 is blocked.

Second mode: detecting a luminance of an external environment of the first camera 11 and/or the second camera 12. Specifically, the detection unit 14 includes a first luminance sensor and a second luminance sensor. The first luminance sensor is located on the first surface, has a distance less than a predetermined threshold d3 with the first camera 11, and is used to sense a luminance of an external environment of the first camera 11. The second luminance sensor is located on the second surface, has a distance less than a predetermined threshold d4 with the second camera 12, and is used to sense a luminance of an external environment of the second camera 12. When the first luminance sensor senses that the luminance of the external environment of the first camera 11 is less than a predetermined luminance threshold $D_{lumiannce}$, the detection unit detects that the first camera 11 is blocked. When the second luminance sensor senses that the luminance of the external environment of the second camera 12 is less than the predetermined luminance threshold $D_{lumiannce}$, the detection unit detects that the second camera 12 is blocked.

The predetermined threshold d3 may be equal to the predetermined threshold d4, and in order to ensure that the luminance sensor can accurately sense the luminance of the external environment of a camera, the luminance sensor should be close to the camera. Those skilled in the art may set the predetermined thresholds d3 and d4 according to an actual case. Optionally, the luminance sensor may also be integrated in the camera as a component thereof.

Third mode: detecting a distance between an external object and the first camera along a shooting direction of the first camera, and a distance between an external object and the second camera along a shooting direction of the second camera, respectively. Specifically, the detection unit 14 includes a first distance sensor and a second distance sensor. The first distance sensor is located on the first surface, has a distance less than a predetermined threshold d5 with the first camera 11, and is used to sense a distance between an external object and the first camera 11 along the shooting direction of the first camera 11. The second distance sensor is located on the second surface, has a distance less than a predetermined threshold d6 with the second camera 12, and is used to sense a distance between an external object and the second camera 12 along the shooting direction of the second camera 12. When the first distance sensor senses that the distance between the external object and the first camera 11 is less than a predetermined distance threshold $D_{distance}$, the detection unit 14 detects that the first camera 11 is blocked. When the second distance sensor senses that the distance between the external object and the second camera 12 is less than the predetermined distance threshold $D_{distance}$, the detection unit 14 detects that the second camera 12 is blocked.

The predetermined threshold d5 may be equal to the predetermined threshold d6, and in order to ensure that the distance sensor can accurately sense the distance between an external object and a camera, the distance sensor should be close to the camera. Those skilled in the art may set the predetermined thresholds d5 and d6 according to an actual case. Optionally, the distance sensor may also be integrated in the camera as a component thereof.

Fourth mode: detecting RGB order graduation value of images captured by the first camera and the second camera. Specifically, in an image in a RGB pattern, R represents red, G represents green, B represents blue, and three primary colors R, G, B are superposed to form other colors. In this pattern, each of the primary colors forms a monochromatic channel separately, and luminance of color in each monochromatic channel is 0 to 256 order graduation. Then three monochromatic channels combine into a composite channel, namely, a RGB channel. Thus, color in each part of an image is determined by order graduation value in three monochromatic channels, i.e. RGB channels. The detection unit 14 can detect whether a camera is blocked by extracting an order graduation value of any of the three primary colors RGB of a captured image or an average of order graduation values of the three primary colors and comparing it with a predetermined order graduation value when the camera is blocked. For example, the detection unit 14 sets that a range of an average of RGB order graduation values of a captured image when a camera is blocked is 0 to $H_a$, and an average of RGB order graduation values of an image captured by the first camera 11 is $H_1$, and an average of RGB order graduation values of an image captured by the second camera 12 is $H_2$. The detection unit detects whether $H_1$ and $H_2$ is within the range of 0 to $H_a$, that is, determines whether $0 \le H_1 \le H_a$, $0 \le H_2 \le H_a$ is established. If established, it indicates that a corresponding camera is blocked, otherwise it is not blocked.

In step S502, controlling an ON/OFF state of the first camera and/or the second camera based on a detection result.

Specifically, when the detection unit 14 detects that one of the first camera 11 and the second camera 12 is blocked, the control unit 15 turns off the blocked camera and turns on the non-blocked camera; and when the detection unit 14 detects that both the first camera 11 and the second camera 12 are blocked, the control unit 15 turns off the first camera 11 and the second camera 12.

In addition, after step S502, the control method 500 may further comprise an image flipping step.

Specifically, a first gravity sensing unit and a second gravity sensing unit are disposed in the flexible screen 13, wherein the first gravity sensing unit is located on the first surface and has a distance less than a predetermined threshold d1 with the first camera 21, the second gravity sensing unit is located on the second surface 24 and has a distance less than a predetermined threshold d2 with the second camera 22, and when the first gravity sensing unit and/or the second gravity sensing unit senses that the first camera 11 and/or the second camera 12 is inverted due to the flexible screen 13 being folded and/or bent, the image captured by the first camera 21 and/or the second camera 22 is flipped. The predetermined threshold d1 may be equal to the predetermined threshold d2, and in order to ensure that the gravity sensing unit can accurately sense whether a camera is inverted, the gravity sensing unit should be close to the camera, and those skilled in the art may set the predetermined thresholds d1 and d2 according to an actual case. Optionally, the gravity sensing unit may also be integrated in the camera as a component thereof.

Accordingly, with the control method for cameras of the electronic device according to an embodiment of the present disclosure, when the front camera and/or the rear camera of the electronic device are blocked, a switching between the front camera and the rear camera can be automatically controlled according to blocked cases of the front camera and/or the rear camera of the electronic device, and there is no need for the user to select manually. In addition, the method for controlling cameras of the electronic device according to the embodiment of the present disclosure can sense inverted cases of the front camera and/or the rear camera, and flip the captured image when the cameras are inverted. Thus, it is possible to automatically determine whether the captured image is inverted and correspondingly make a flip, and there is no need for the user to select manually. Therefore, user experience can be improved effectively It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise . . . " do not exclude there being additional identity elements in the procedure, method, product or equipment of the elements.

As will be appreciated by those of ordinary skill in the art, the embodiments disclosed herein can be implemented by way of electronic hardware, computer software, or a combination of the two. To clearly illustrate the interchangeability between hardware and software, components and steps of respective examples have already been described in a general way in terms of functions in the above description. These functions are to be executed by hardware manner or software manner depending upon the particular application of the technique process and design constraints. Those skilled in the art can use different methods to achieve the described functions with respect to each specific application, but such implementation should not be construed as going beyond the scope of the present disclosure.

Those skilled in the art should understand that, the above respective embodiments are merely provided for describing the technical solutions of the present disclosure, but not intended to make limitations thereto. Although the present disclosure has already been described in detail with reference to the preceding respective embodiments, those skilled in the art may make modifications to the technical solutions recorded in the preceding respective embodiments, or make equivalent replacements to parts of or all technical features contained therein; such modifications or replacements do not make the essence of corresponding technical solutions depart from the scope of the claims of the present disclosure.

The invention claimed is:

1. An electronic device, comprising:
    a flexible screen configured to be folded and/or bent by a user;
    a first camera disposed on a first surface of the flexible screen;
    a second camera disposed on a second surface of the flexible screen;
    a detector that includes two sensors located on the first surface and the second surface, respectively and have a distance less than a predetermined threshold with the first camera and the second camera, respectively, and is operable to detect, in a first condition, whether the first camera and/or the second camera is blocked because the flexible screen is folded and/or bent; and
    a controller operable to control an ON/OFF state of the first camera and/or the second camera based on a detection result of the detector.

2. The electronic device of claim 1, wherein, when the detector detects that one of the first camera and the second camera is blocked, the controller turns off the blocked camera and turns on the non-blocked camera; and when the detector detects that both the first camera and the second camera are blocked, the controller turns off the first camera and the second camera.

3. The electronic device of claim 2, wherein the detector detects a folded state and/or a bent curvature of the flexible screen:
    when the detector detects that the folded state is a first folded state and/or the bent curvature is a first bent curvature, the detector detects that the first camera is blocked; and
    when the detector detects that the folded state is a second folded state and/or the bent curvature is a second bent curvature, the detector detects that the second camera is blocked.

4. The electronic device of claim 2, wherein the two sensors include:
    a first luminance sensor located on the first surface, having a distance less than a first predetermined threshold with the first camera, and used to sense a first luminance of an external environment of the first camera; and
    a second luminance sensor located on the second surface, having a distance less than a second predetermined threshold with the second camera, and used to sense a second luminance of an external environment of the second camera,
    wherein when the first luminance is less than a predetermined luminance threshold, the detector detects that the first camera is blocked and when the second luminance is less than the predetermined luminance threshold, the detector detects that the second camera is blocked.

5. The electronic device of claim 2, wherein the two sensors include:
    a first distance sensor located on the first surface, having a distance less than a third predetermined threshold with the first camera, and used to sense a first distance between an external object and the first camera along a shooting direction of the first camera; and
    a second distance sensor located on the second surface, having a distance less than a fourth predetermined threshold with the second camera, and used to sense a second distance between an external object and the second camera along a shooting direction of the second camera,
    wherein when the first distance is less than a predetermined distance threshold, the detector detects that the first camera is blocked and when the second distance is less than the predetermined distance threshold, the detector detects that the second camera is blocked.

6. The electronic device of claim 1, wherein the two sensors include a first gravity sensing unit and a second gravity sensing unit, wherein the first gravity sensing unit is located on the first surface and has a distance less than a fifth predetermined threshold with the first camera, and the second gravity sensing unit is located on the second surface and has a distance less than a sixth predetermined threshold with the second camera, and when the first gravity sensing unit and/or the second gravity sensing unit senses that the first camera and/or the second camera is inverted due to the flexible screen being folded and/or bent, the controller flips an image captured by the first camera and/or the second camera.

7. A control method for cameras of an electronic device, the electronic device including a flexible screen configured to be folded and/or bent and having a first camera disposed on a first surface of the flexible screen and a second camera disposed on a second surface of the flexible screen, the control method comprising:
    detecting by two sensors located on the first surface and the second surface, respectively and have distance less than a predetermined threshold with the first camera and the second camera, respectively, in a first condition, whether the first camera and/or the second camera is blocked because the flexible screen is folded and/or bent; and
    controlling an ON/OFF state of the first camera and/or the second camera based on a detection result.

8. The control method of claim 7, wherein when it is detected that one of the first camera and the second camera is blocked, the blocked camera is turned off and the non-blocked camera is turned on; and when it is detected that both the first camera and the second camera are blocked, the first camera and the second camera are turned off.

9. The control method of claim 8, wherein detecting, in a first condition, whether the first camera and/or the second camera is blocked because the flexible screen is folded and/or bent includes detecting a folded state and/or a bent curvature of the flexible screen, when it is detected that the folded state is a first folded state and/or the bent curvature is a first bent curvature, detecting that the first camera is blocked; and when it is detected that the folded state is a second folded state and/or the bent curvature is a second bent curvature, detecting that the second camera is blocked.

10. The control method of claim 8, wherein detecting, in a first condition, whether the first camera and/or the second camera is blocked because the flexible screen is folded and/or bent includes detecting a luminance of an external environment of the first camera and/or the second camera, when a luminance of an external environment of the first camera is less than a predetermined luminance threshold, detecting that the first camera is blocked; and when a luminance of an external environment of the second camera is less than the predetermined luminance threshold, detecting that the second camera is blocked.

11. The control method of claim 8, wherein the two sensors include a first distance sensor and a second distance sensor and the detecting, in a first condition, whether the first camera and/or the second camera is blocked because the flexible screen is folded and/or bent includes detecting by the first distance sensor a distance between an external object and the first camera along a shooting direction of the first camera, and detecting by the second distance sensor a distance between an external object and the second camera along a shooting direction of the second camera, respectively, when a distance between the first camera and the external object is less than a predetermined distance threshold, detecting that the first camera is blocked; and when a distance between the second camera and the external object is less than the predetermined distance threshold, detecting that the second camera is blocked.

12. The control method of claim 7, wherein the the two sensors include a first gravity sensing unit and a second gravity sensing unit, the first gravity sensing unit is located on the first surface and has a distance less than a fifth predetermined threshold with the first camera, and the second gravity sensing unit is located on the second surface and has a distance less than a sixth predetermined threshold with the second camera, and when the first gravity sensing unit and/or the second gravity sensing unit senses that the first camera and/or the second camera is inverted due to the flexible screen being folded and/or bent, an image captured by the first camera and/or the second camera is flipped.

* * * * *